(12) United States Patent
Papamoschou

(10) Patent No.: US 8,997,454 B2
(45) Date of Patent: *Apr. 7, 2015

(54) TURBOFAN ENGINE NOISE SUPPRESSION USING FAN FLOW DEFLECTOR

(75) Inventor: Dimitri Papamoschou, Mission Viejo, CA (US)

(73) Assignee: The Regents of the University of California, Oakland, CA (US)

(*) Notice: Subject to any disclaimer, the term of this patent is extended or adjusted under 35 U.S.C. 154(b) by 1490 days.

This patent is subject to a terminal disclaimer.

(21) Appl. No.: 11/652,230

(22) Filed: Jan. 10, 2007

(65) Prior Publication Data
US 2010/0254803 A1   Oct. 7, 2010

Related U.S. Application Data

(63) Continuation-in-part of application No. 10/393,173, filed on Mar. 20, 2003, now Pat. No. 7,293,401.

(60) Provisional application No. 60/366,379, filed on Mar. 20, 2002.

(51) Int. Cl.
   *F02K 1/42* (2006.01)
   *F02K 1/44* (2006.01)
   *F02K 1/38* (2006.01)

(52) U.S. Cl.
   CPC ............. *F02K 1/383* (2013.01); *F02K 1/386* (2013.01); *F02K 1/42* (2013.01)

(58) Field of Classification Search
   CPC ........... F02K 1/386; F02K 1/383; F02K 1/40; F02K 1/42; F02K 1/44
   USPC ............. 60/226.1, 262, 264, 770, 230, 228; 239/265.19, 265.23, 265.35; 181/213, 181/220
   See application file for complete search history.

(56) References Cited

U.S. PATENT DOCUMENTS

| | | | |
|---|---|---|---|
| 2,654,552 A * | 10/1953 | Jonas | 60/230 |
| 3,997,132 A * | 12/1976 | Erwin | 244/55 |
| 4,235,397 A * | 11/1980 | Compton | 60/230 |
| 4,280,587 A * | 7/1981 | Bhat | 60/262 |
| 4,372,110 A * | 2/1983 | Fletcher et al. | 60/262 |
| 6,502,383 B1 * | 1/2003 | Janardan et al. | 60/226.1 |
| 6,612,106 B2 * | 9/2003 | Balzer | 60/770 |
| 6,945,031 B2 * | 9/2005 | Lair | 60/226.1 |
| 6,983,588 B2 * | 1/2006 | Lair | 60/226.1 |
| 7,293,401 B2 * | 11/2007 | Papamoschou | 60/226.1 |
| 2002/0064453 A1 * | 5/2002 | Tse | 415/119 |
| 2002/0125340 A1 * | 9/2002 | Birch et al. | 60/770 |
| 2004/0187476 A1 * | 9/2004 | Lair | 60/226.1 |
| 2006/0101803 A1 * | 5/2006 | White | 60/262 |
| 2006/0191267 A1 * | 8/2006 | Song et al. | 60/771 |

* cited by examiner

*Primary Examiner* — Ted Kim
(74) *Attorney, Agent, or Firm* — Blakely Sokoloff Taylor & Zafman LLP

(57) ABSTRACT

An embodiment of the invention is a technique to suppress noise in a jet engine. A substantially annular fan nozzle of a separate-flow turbofan engine includes a flow boundary surface and an outlet to discharge fan air into atmosphere. At least one vane extends substantially radially from the flow boundary surface to vector at least a portion of the fan air toward a direction where noise suppression is desired. The vane is situated in proximity of the outlet and has a span substantially greater than a thickness of a local boundary layer of the fan air.

32 Claims, 16 Drawing Sheets

TURBOFAN ENGINE NOISE SUPPRESSION USING FAN FLOW DEFLECTOR

This patent application is a continuation-in-part of the Patent application titled "Jet Engine Noise Suppressor", Ser. No. 10/393,173, filed on Mar. 20, 2003 now U.S. Pat. No. 7,293,401, which claims the benefit of the provisional application, titled "Jet Engine Noise Suppressor", filed on Mar. 20, 2002, Ser. No. 60/366,379.

This invention was made with Government support under Grant No. NAG-3-2345, awarded by the National Aeronautics & Space Administration. The Government has certain rights in this invention.

BACKGROUND

1. Field of the Invention

Embodiments of the invention relate to jet engines, and more specifically, to jet engine noise suppression and thrust vectoring.

2. Description of Related Art

Aircraft noise has been a major problem in the aircraft industry. Among the sources of aircraft noise, jet engine noise is a dominant source. For commercial aircraft, the noise level becomes significant during both take-off and landing, causing concerns to local community near airports.

Current techniques to suppress jet engine noise have a number of drawbacks. Techniques relying on corrugated or fluted exhaust nozzles or additional passages connected to exhaust gas flow can only reduce some amount of noise at the expense of thrust loss and base drag increase. Other techniques do not provide satisfactory results or are not flexible to accommodate different engine operational modes in a typical aircraft flight route.

SUMMARY OF THE INVENTION

An embodiment of the invention is a technique to suppress noise in a turbofan engine. A substantially annular fan nozzle of a separate-flow turbofan engine includes a flow boundary surface and an outlet to discharge fan air into atmosphere. At least one vane extends substantially radially from the flow boundary surface to vector at least a portion of the fan air toward a direction where noise suppression is desired. The vane is situated in proximity of the outlet and has a span substantially greater than a thickness of a local boundary layer of the fan air.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to suppress noise in a turbofan engine. A substantially annular fan nozzle of a separate-flow turbofan engine includes a flow boundary surface and an outlet to discharge fan air into atmosphere. At least one vane extends substantially radially from the flow boundary surface to vector at least a portion of the fan air toward a direction where noise suppression is desired. The vane is situated in proximity of the outlet and has a span substantially greater than a thickness of a local boundary layer of the fan air.

In the following description, numerous specific details are set forth. However, it is understood that embodiments of the invention may be practiced without these specific details. In other instances, well-known structures and techniques have not been shown in order not to obscure the understanding of this description.

Figure 1:
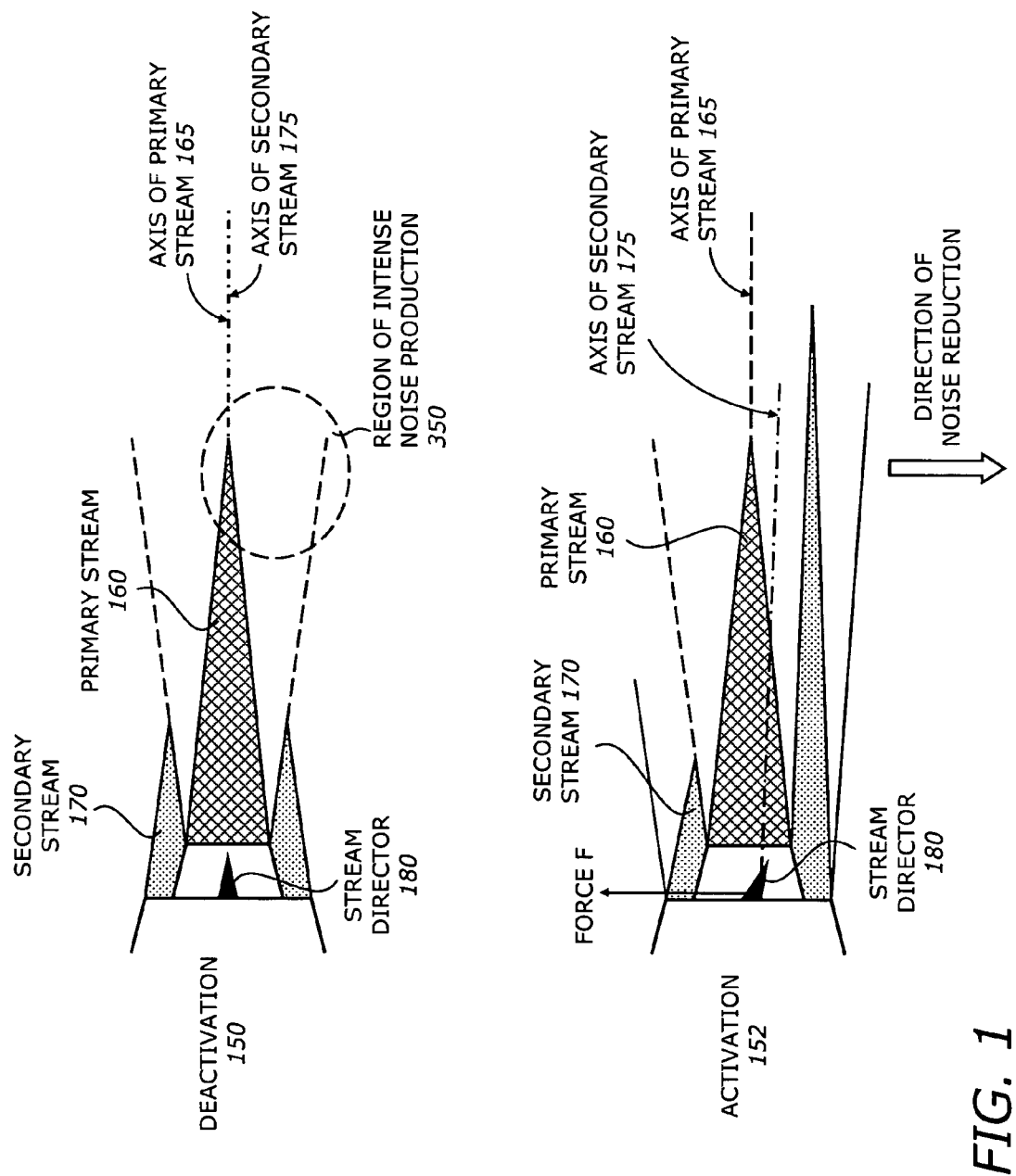
FIG. 1 is a diagram illustrating a basic principle of fan flow deflection system for noise suppression according to one embodiment of the invention.

FIG. 1 is a diagram illustrating a basic principle of noise suppression according to one embodiment of the invention. The principle of noise suppression may be explained from a deactivation condition 150 and an activation condition 152. In this illustrative example, there are two air streams exhausted from an aircraft engine: a primary stream 160 and a secondary stream 170. The two streams may be discharged from two nozzles in a turbofan engine such as the fan and core nozzles.

The principle of noise suppression or reduction is based on a directional noise reduction method. In other words, noise is suppressed when the direction of the primary stream 160 or the secondary stream 170 is altered such that the slower secondary stream 170 is concentrated or forced adjacent to the faster primary stream 160 in the region where intense noise is generated and in a direction where noise reduction is desired. In a typical jet exhaust configuration at the exit of the jet engine, the primary stream 160 is a fast stream which forms around an axis 165 of primary stream, typically aligned with the center line of the engine core. The region around the end of the primary stream 160 is a region of intense noise production 350. In this region, high-speed primary stream 160 is very turbulent and jet noise emission is the most significant. The secondary stream 170 is typically slower than the primary stream 160 and forms around the start of the primary stream 160. The secondary stream 170 has an axis 175 of secondary stream. Suppose a stream director 190 is positioned at a location in the vicinity of the exit of the secondary nozzle and is substantially immersed in the secondary stream 170 exiting the nozzle.

In the deactivated mode 150, the stream director 180 is at the retracted position where it is substantially aligned with the axis 165 of the primary stream 160 which is substantially coaxial with the axis 175 of the secondary stream 170. In this condition, the primary and secondary streams 160 and 170 are substantially coaxial. In this configuration, the secondary stream 170 ends well upstream of the end of the primary stream 160 resulting in little or no noise suppression.

In the activation mode 152, the stream director 180 is at the extended position. The stream director generates a force F which causes a deflection of the secondary stream 170 so that the axis of the secondary stream 175 is no longer aligned with the axis 165 of the primary stream 160. The secondary stream 170 is vectored in the general direction where noise reduction is desired. In typical applications, this direction will be downward (towards the ground) and/or sideward. For the illustrative discussion that follows, the direction of noise reduction is taken to be downward. The force F induces a downward vectoring of the secondary flow so that the lower portion of the secondary flow is elongated. Moreover, the downward induction of secondary flow results in a layer of substantially unmixed flow around and downstream of the lower portion of the secondary stream 170. The result is that a layer of potential or substantially unmixed flow covers the region of intense noise production 180. In the vicinity of the region of intense noise production 350, the high-speed primary stream 160 and the layer of substantially unmixed flow form an eccentric configuration. This eccentric configuration causes noise suppression at the downward and sideward directions. The eccentricity of the high-speed primary flow and substantially unmixed secondary flow depends on the on the angle of deflection of the axis 175 of the secondary stream 170 relative to the axis 165 of the primary stream 160. Since the activation of the stream director 180 creates the force F that produces this deflection, the stream director 180 may be referred to as a force generator. FIG. 1 depicts a simplified version of this process wherein a unidirectional force F is shown. However, in general the force F may be a distributed force causing a distributed deformation of the secondary stream according to the range of directions in which noise suppression is desired.

Although the above discussion refers to two operating modes: the activation mode and the de-activation mode, the same principle may apply when the exhaust system operates only in the activation mode. In this situation, the stream director 190 may be fixed it its configuration or position.

In a separate-flow turbofan engine, wherein a core stream and a fan stream are discharged from different nozzles into atmosphere, the primary stream 160 is the core stream and the secondary stream 170 is the fan stream.

Figure 2A:
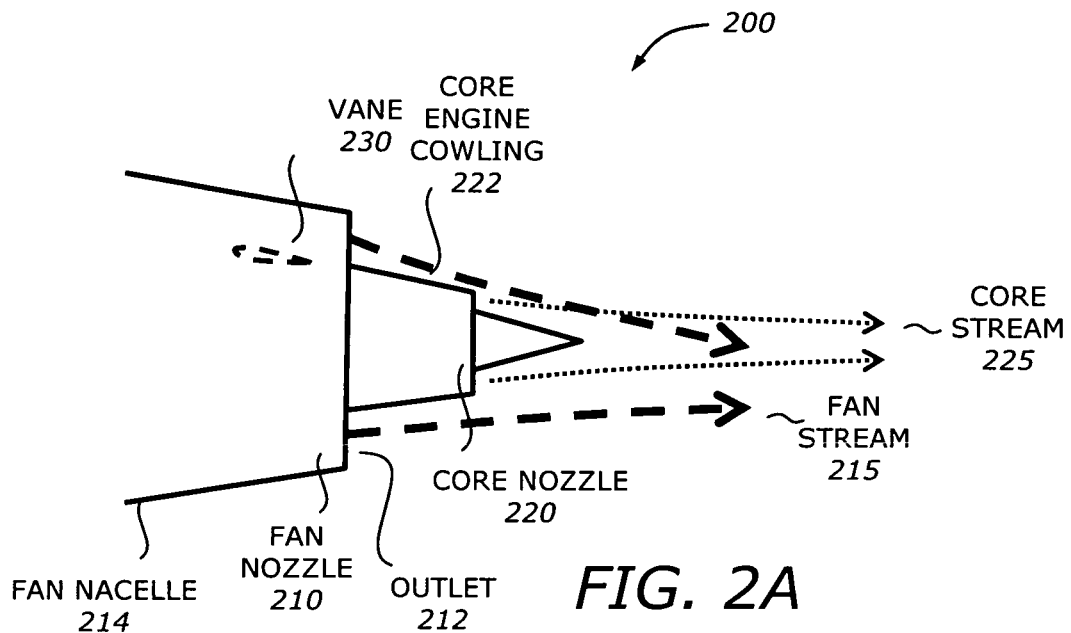
FIG. 2A is a diagram illustrating a side view of a fan flow deflection system according to one embodiment of the invention.

FIG. 2A is a diagram illustrating a side view of an exhaust system 200 according to one embodiment of the invention. The exhaust system 200 is a noise suppression system for a turbofan engine used in an aircraft. It includes a fan nozzle 210, a core nozzle 220, and at least one vane 230. The fan nozzle 210 has a substantially annular cross section and is defined by a substantially annular passage between the inner surface of a fan nacelle 214 and a core engine cowling 222. The vane 230 functions as the stream director 180 of FIG. 1.

The fan nozzle 210, the fan nacelle 214, the core nozzle 220, and the core engine cowling 222 represent the well-known art of the exhaust of a separate-flow turbofan engine. The fan nozzle 210 and the core nozzle 220 are parts of a jet engine of an aircraft. The fan nozzle 210 receives fan air from the fan section of the engine and discharges a fan stream 215 into atmosphere from the outlet 212. The core nozzle 220 receives core air from the core section of the engine and discharges a core stream 225 into the atmosphere. In normal operation, the fan stream 215 and the core stream 225 are substantially coaxial. The core engine cowling 222 is a housing or a cover that covers the core engine.

The vane 230 operates essentially in the same principle as the stream director 180 shown in FIG. 1. It vectors, directs, deflects, diverges, or steers, at least a portion of the fan stream 215 in a general direction where noise reduction is desired. As discussed above, the vectoring of the fan stream 215 creates an eccentric configuration at substantially the sideward and/or downward directions, or in whichever direction where the noise reduction is desired. This is shown in FIG. 2A by illustrative streamlines of the fan stream 215 and core stream 225. The vane 230 creates a force that vectors the fan air in the general direction of noise reduction. Depending on the direction and distribution of this force, the movement of the fan stream 215 may be sideward and/or downward.

Figure 3:
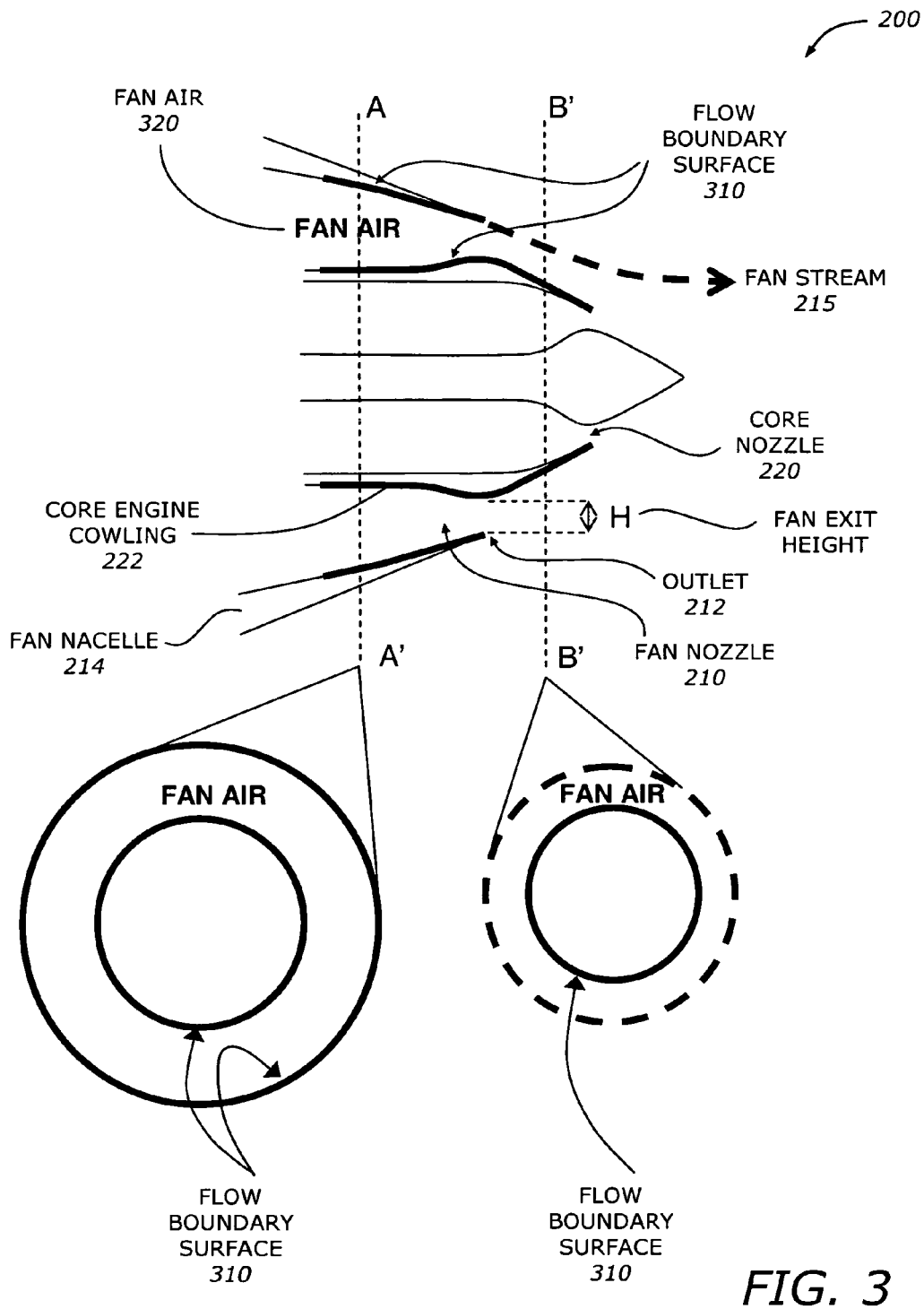
FIG. 3 is a diagram illustrating cross sections of the exhaust nozzle according to one embodiment of the invention.

FIG. 3 is a diagram illustrating a cross section of the exhaust nozzle according to one embodiment of the invention. It shows the longitudinal and selected transverse cross sections of the turbofan exhaust. There are two cross sections AA' and BB' which define an area where the vane or vanes 230 may be located. The vane 230 extends in a substantially radial direction from a flow boundary surface 310.

The flow boundary surface 310 is defined as the surface wetted by (e.g., in contact with) a fan air 320 over which the dynamic pressure of the fan air 320 is sufficiently large for the vanes to create a force that effectively vectors the fan stream 215. The solid heavy black lines of FIG. 3 illustrate the flow boundary surface 310. The flow boundary surface 310 includes a portion of the annular passage of the fan nozzle 210 upstream of the outlet 212 at the section AA' as well as any portion of the core engine cowling 222 that protrudes downstream of the outlet 212 at the section BB'. The annular portion of the flow boundary surface at the section AA' extends upstream of the outlet 212 to the point where the dynamic pressure drops to about 10% of the dynamic pressure at the outlet 212. In common turbofan designs, this distance is on the order of 5H where H is the fan exit height, defined as the distance between the cowling 222 and the inner surface of the fan nacelle 214 at outlet 212 of the fan nozzle 210. Although the illustration of the flow boundary surface of FIG. 3 uses the common design of a separate-flow turbofan engine where the core nozzle 220 protrudes from the fan nacelle 214, the aforementioned definition of the flow boundary surface 310 applies equally well to designs where the core nozzle 220 ends upstream of the outlet 212 the fan nozzle 210. In cases where transverse surfaces (e.g., bifurcations or a pylon) intersect the fan nozzle 210 or extend from the cowling 222, these surfaces are not included in the aforementioned definition of the flow boundary surface 310.

Figure 4A:
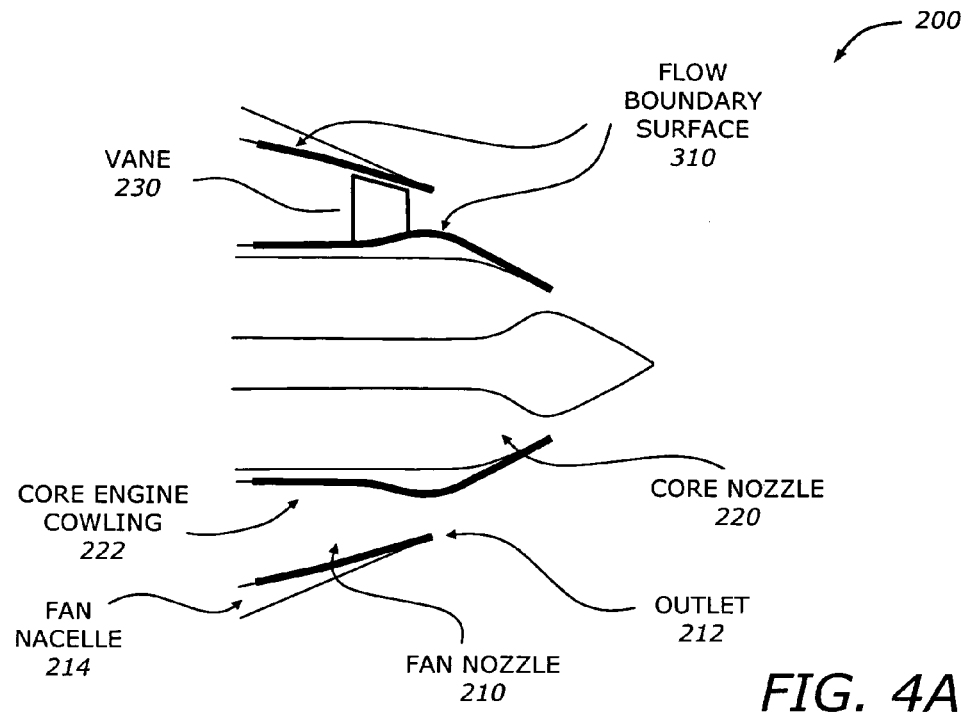
FIG. 4A is a diagram illustrating a cross section of the exhaust nozzle having a vane inside the fan nozzle according to one embodiment of the invention.

FIG. 4A is a diagram illustrating a cross section of the exhaust nozzle having a vane inside the fan nozzle according to one embodiment of the invention. It depicts the vane 230 installed inside the fan nozzle 210 and extending radially from the core engine cowling 222. For commercial engines it may be preferable to place the vane upstream of the outlet 212 (e.g., inside the fan nozzle 210) to mitigate any shock phenomena, and resulting thrust losses, that could arise from high Mach numbers outside or in the vicinity of the outlet 212.

The span of the vane 230 is substantially larger than the thickness of a local boundary layer for the vane 230 to develop a lift force that vectors the fan air 320 into the fan stream 215. The span is the distance between the root and the tip of the vane 230. The root of the vane is the side of the vane attached to a solid surface (e.g., cowling 222 or inner surface of fan nacelle 214) and the tip of the vane is the side of the vane distal to the root. If the vane is supported on both sides, the meanings of root and tip are interchangeable. For a vane installed inside the fan nozzle 210, the typical span of the vane 230 may range from 20% to 100% of the local width of the annulus of the fan nozzle 210. The annulus of the fan nozzle 210 is defined by the core engine cowling 222 and the inner surface of the fan nacelle 214. The local boundary layer is a layer of reduced velocity in fluids that is immediately adjacent to the surface of a solid past which the fluid is flowing. Because of the reduced velocity, if a vane, or any other aerodynamic device, is confined to the boundary layer, it cannot develop a sufficient force to vector or deflect the flow. Therefore, the span of the vane 230 is substantially larger than the local boundary thickness so that the vane 230 extends outside the boundary layer to cause vectoring.

Figure 4B:
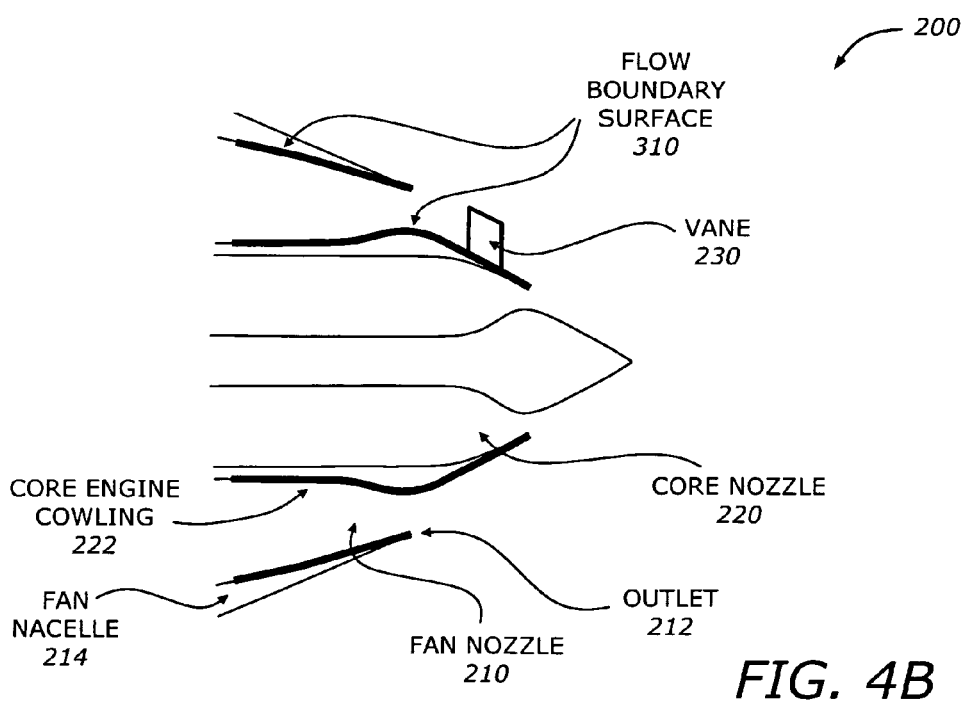
FIG. 4B is a diagram illustrating a cross section of the exhaust nozzle having a vane outside the fan nozzle according to one embodiment of the invention.

FIG. 4B is a diagram illustrating a cross section of the exhaust nozzle having a vane outside the fan nozzle according to one embodiment of the invention. The vane 230 may be installed downstream of the outlet 212 on the portion of the cowling 222 that protrudes outside the outlet 212. For a vane installed outside the fan nozzle 210 on the core engine cowling 222, the typical span of the vane 230 may range from 20% to 200% of the fan exit height H.

Intermediate placements of the vane 230 are also possible, with the leading edge of the vane upstream of the outlet 212 and the trailing edge of the vane downstream of the outlet 212.

Figure 5:
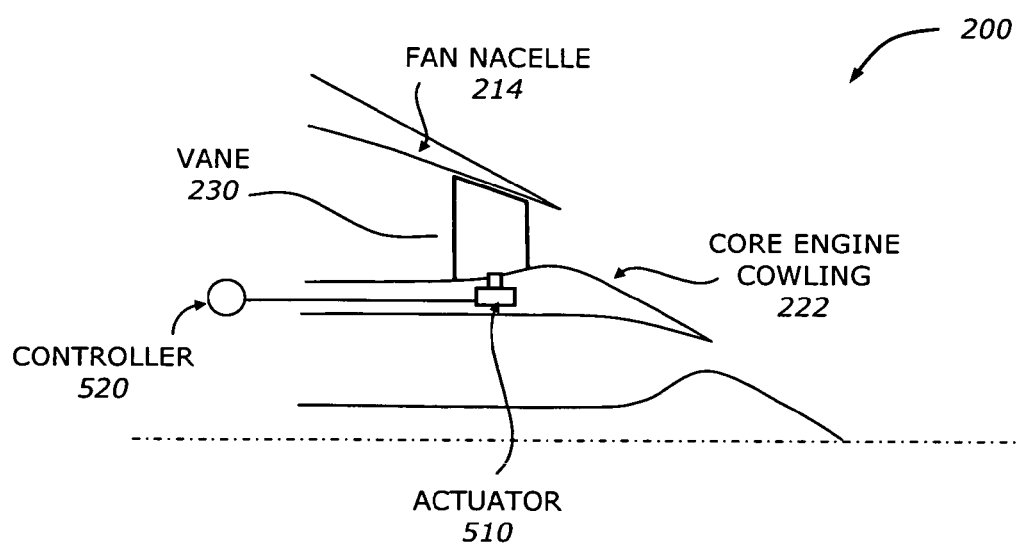
FIG. 5 is a diagram illustrating a cross section of the exhaust nozzle having a vane and an actuator according to one embodiment of the invention.

FIG. 5 is a diagram illustrating a cross section of the exhaust nozzle having a vane and an actuator according to one embodiment of the invention. The vane 230 may be actuated using an actuator 510 and a controller 520.

The vane 230 may have a fixed or variable geometry. Variable geometry is possible by actuating the vane 230 using the actuator 510 that is controlled by the controller 520. The actuator 510 is coupled to the vane 230 to actuate the vane 230 so that the vane 230 has a variable or adjustable position. The controller 520 is coupled to the actuator 510 to control the actuator 510 to activate or de-activate the vane 230. The controller 510 may be located in the engine, wing, fuselage, or in any other suitable location of an aircraft. The controller 520 receives control signals either from the flight crew (e.g., pilot), from a prescribed control sequence, or from an automatic sensing instrument. The prescribed control sequence may be such as to maximize noise reduction at each monitoring/certification point or to maximize the cumulative noise reduction at all monitoring/certification points; such monitoring/certification points include the sideline, takeoff/cutback, and approach monitors. The controller 510 generates control signals to the actuator 520 to activate or deactivate the vane 230. The actuator 510 may activate the vane 230 using at least one of pneumatic, hydraulic, mechanical, electrical, and electromagnetic action or a valve. The actuator 520 and/or the vane 230 may be fabricated, in part or in full, using a shape-memory alloy that is activated by electricity or by the temperature of the fan flow. Any alloy that possesses the shape-memory property, i.e., the ability to remember the original shapes, may be used. Examples of shape-memory alloys include nickel-titanium, copper-aluminum, copper-zinc-aluminum, and iron-manganese-silicon alloys. Use of a shape-memory alloy activated by the temperature of the fan air would enable autonomous operation of the vane 230 thus obviating the use of the controller 520.

The actuator 510 may be housed within the structure of the core engine cowling 222 as shown in FIG. 5. However, the actuator 510 may also be housed within the structure of the fan nacelle 214. The vane 230 may be supported by the cowling 222, the fan nacelle 214, or both.

Figure 6A:
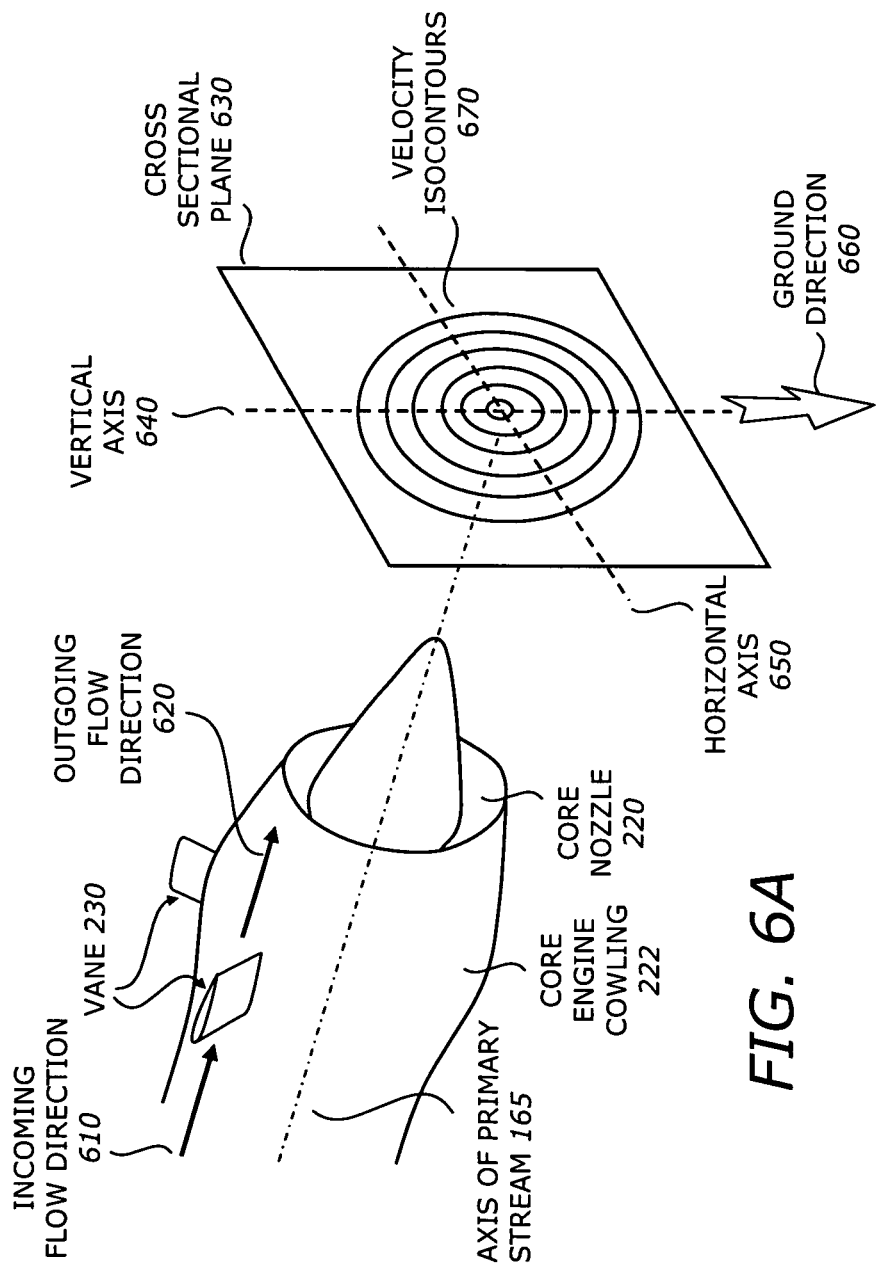
FIG. 6A is a diagram illustrating a velocity distribution in the jet plume with vanes absent or deactivated according to one embodiment of the invention.

FIG. 6A is a diagram illustrating a velocity distribution in the jet plume with vanes absent or deactivated according to one embodiment of the invention. It depicts the flow field in vicinity of the vane and the resulting velocity distribution in the jet plume downstream of the nozzle when the vane is deactivated or absent. For clarity, the fan nacelle 214 is omitted in this figure as well as in subsequent FIGS. 6B-6D.

The deactivated vane 230 is shown as a vane with symmetric airfoil aligned (e.g., having a zero angle of attack) with an incoming flow direction 610. The incoming flow direction 610 is substantially aligned with the axis of the primary stream 165. In the absence of a vane, or with the vane deactivated, the outgoing flow direction 620 is the same direction as the incoming flow direction 610.

A cross-sectional plane 630 may be defined as a plane that is substantially perpendicular to the axis of the primary stream 165 located downstream of the core nozzle 220. In the cross sectional plane 630, the isocontours of the mean (time-averaged) axial velocity (henceforth called the velocity isocontours) 670 are substantially concentric, indicating a substantially symmetric, or coaxial, velocity distribution. The isocontours depict the distribution of the mean axial velocity in the jet plume. The jet plume is the flow that results from the interactions or mixing of the core stream 225, the fan stream 215, and the ambient, or atmospheric, air. The ambient air may be static or in motion (e.g., when the airplane moves forward). The axial velocity is the velocity component along the axis of the core stream 165. Because the flow is turbulent, or unsteady, to fully describe the velocity, it may be necessary to describe it in terms of space and time. By time averaging the velocity at a given point in space, the resulting mean velocity is a function of space only. Each contour, therefore, defines a certain value, or level, of the mean velocity. For example, contours may be drawn for velocity levels of 300 meters per second (m/s), 250 m/s, 200 m/s, 150 m/s, and 50 m/s. This is similar to the pressure isobars on weather maps. For a given set of contour levels, an increased distance between contours indicates a reduction of the gradient, or slope, of the velocity, and vice versa.

Figure 6B:
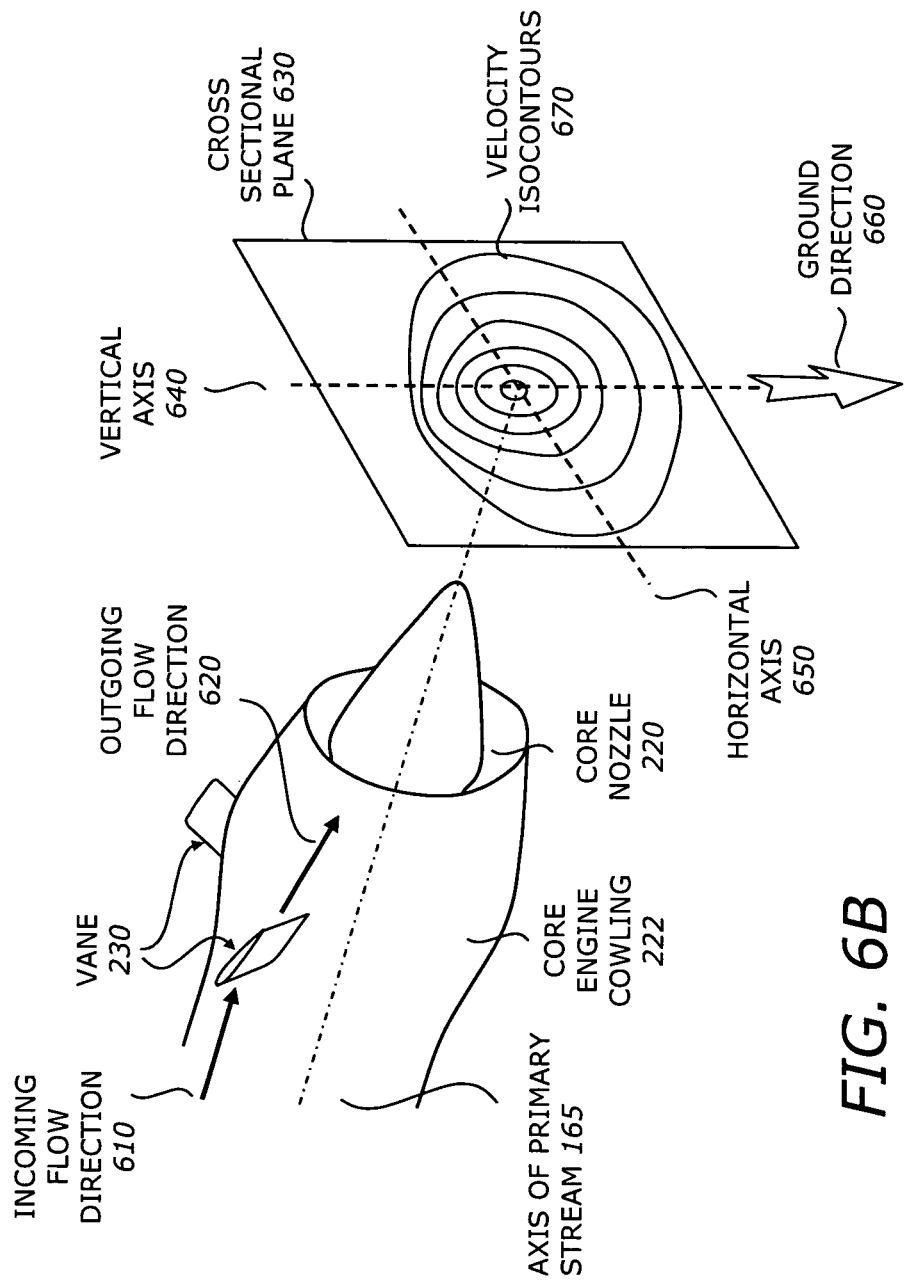
FIG. 6B is a diagram illustrating a velocity distribution in the jet plume with vanes activated according to one embodiment of the invention.
Figure 6C:
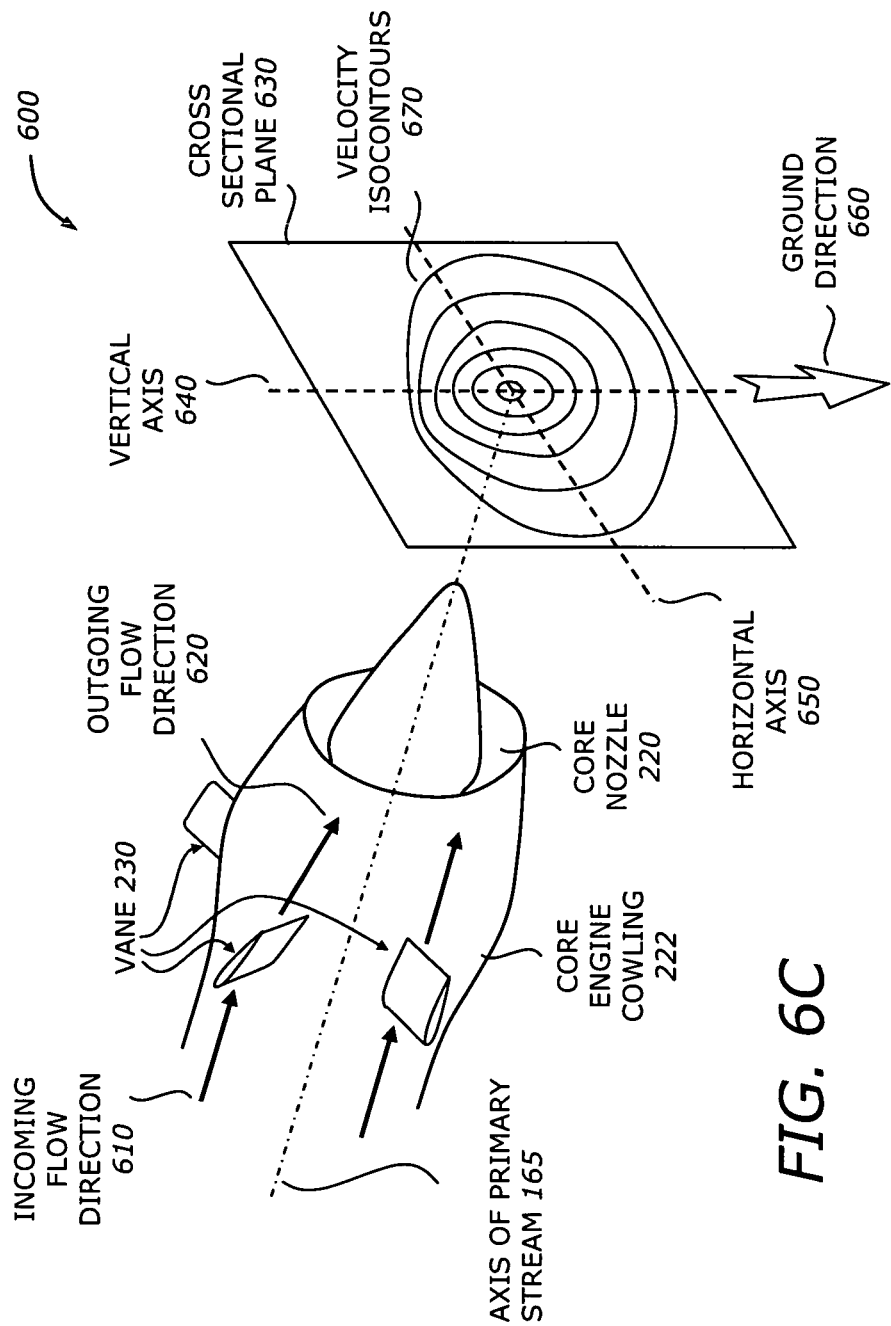
FIG. 6C is a diagram illustrating a velocity distribution in the jet plume with a top pair of vanes being activated and a bottom pair of vanes being deactivated according to one embodiment of the invention.
Figure 6D:
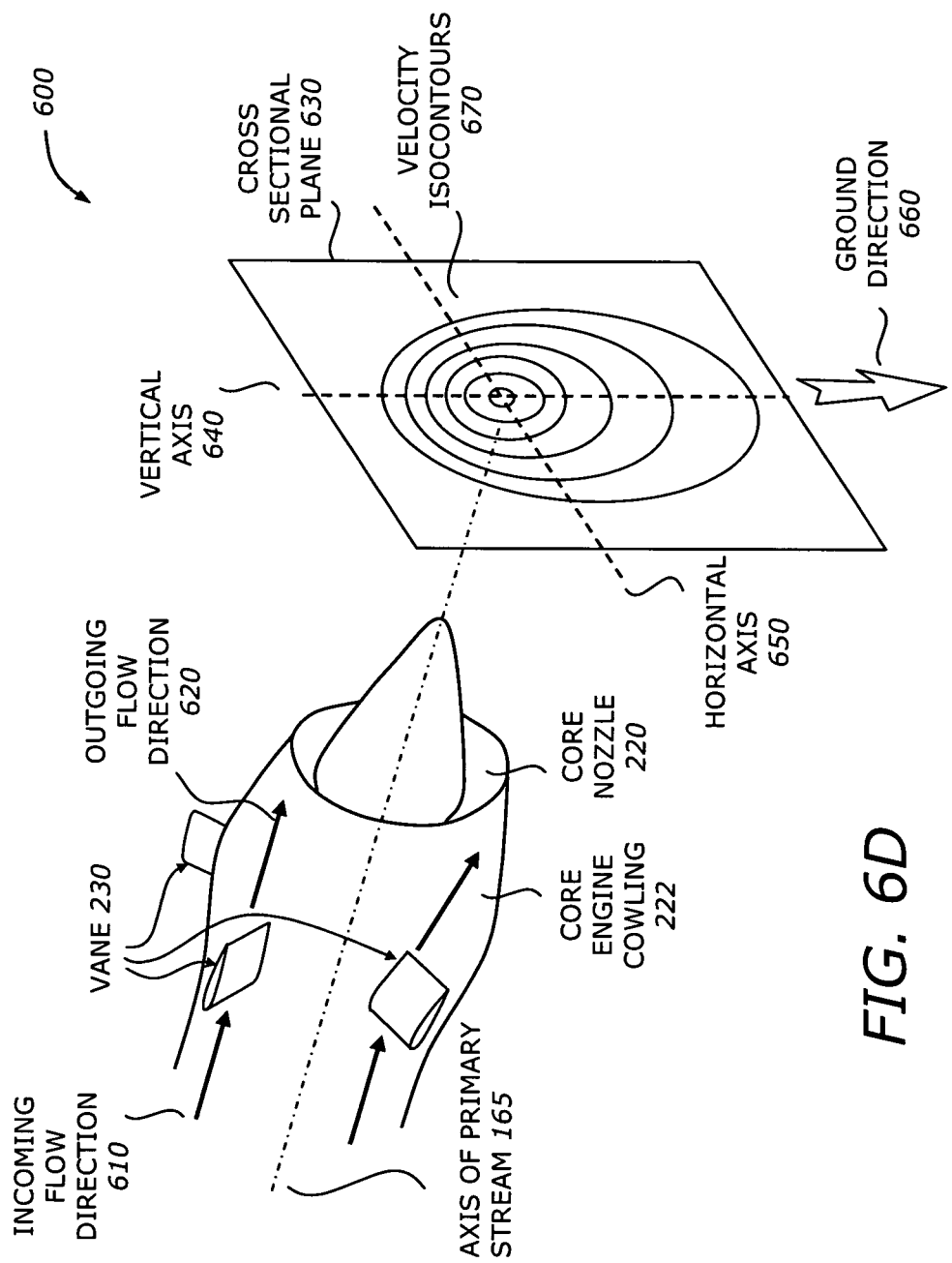
FIG. 6D is a diagram illustrating a velocity distribution in the jet plume with a bottom pair of vanes being activated and a top pair of vanes being deactivated according to one embodiment of the invention.

In reference to FIG. 6A and subsequent FIGS. 6B-6D, the velocity contour levels 670 are maximum near the axis of the primary stream 165 and decline with increasing distance from the axis of the primary stream 165. The cross sectional plane 630 has a vertical axis 640 and a horizontal axis 650 which are perpendicular to each other. The vertical axis 640 and the horizontal axis 650 correspond to the yaw axis and lateral axis of an airplane, respectively.

FIG. 6B is a diagram illustrating a velocity distribution in the jet plume with vanes activated according to one embodiment of the invention. It depicts the flow field in vicinity of the vane 230 and the resulting velocity distribution of in the jet plume downstream of the nozzle when the vane is activated. For illustrative purposes, a pair of vanes located above the horizontal centerplane of the nozzle is considered, with the vane cross section being a symmetric airfoil. The horizontal centerplane is defined as the plane passing through the horizontal axis 650 and the axis of the primary stream 165. Also for illustrative purposes, activation of the vane is shown as rotation of the vane to an angle of attack relative to the incoming flow direction 610, although other activation modes are also possible and will be discussed later.

The vanes 230 are arranged and rotated symmetrically around the vertical centerplane of the nozzle, defined as the plane passing through the vertical axis 640 and the axis of the primary stream 165. The incoming flow direction is 610 is substantially aligned with the axis of the primary stream 165. The outgoing flow is vectored by each vane 230 to the outgoing flow direction 620 that is not aligned with the incoming flow direction 610. In the illustration of FIG. 6B, the outgoing flow direction 620 is vectored mainly the sideward direction and partly in the downward direction. The sideward direction is defined as a direction along the horizontal axis 640 away from the axis of the primary flow 165. The downward direction is defined as a direction along the vertical axis 640 in the direction of the ground 660.

In a cross sectional plane 630 downstream of the core nozzle 220, the velocity isocontours 670 are non-concentric and displaced mainly in the sideward and partly in the downward directions. The resulting velocity distribution is asymmetric (e.g., non-coaxial, or eccentric) with reduced gradients mainly in the sideward directions and partly in the downward direction. The reduction of gradient is expected to cause a reduction of noise in the general direction of the reduced gradient. In the example of FIG. 6B, the reduction of noise is expected to occur primarily in the sideward directions and partly in the downward direction. Additional noise reduction mechanisms may include refraction and convective Mach number reduction. The particular deformation of the velocity isocontours 670 exemplified in FIG. 6B may be suitable for reduction of sideline noise on takeoff.

Figure 2B:
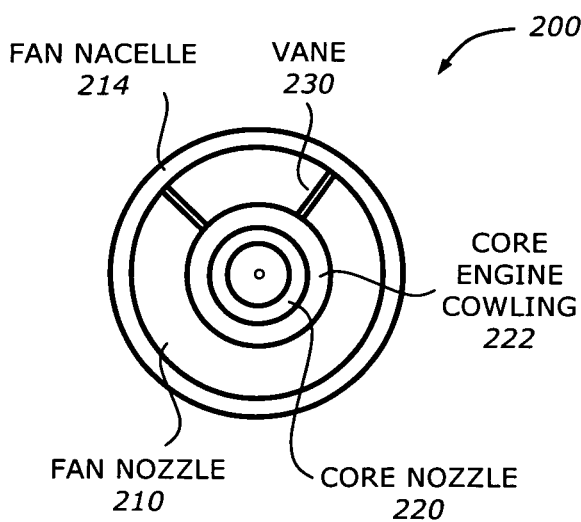
FIG. 2B is a diagram illustrating a rear view of a fan flow deflection system according to one embodiment of the invention.

Different azimuthal positions of the pair of vanes illustrated in FIG. 6B may result in different directionality of the velocity gradients and of the ensuing noise reduction. For a given activation of the vane 230, the contour of the cowling 222 as well as the contour of the inner surface of the nacelle 214 (FIG. 2) may act as additional factors in vectoring the outgoing flow direction 620. Therefore, the resulting deformation of the velocity field in the plume, illustrated by the velocity isocontours 670, may depend on the activation of the vane combined with the geometry of the flow boundary surface 310 (FIG. 3).

FIGS. 6C and 6D are diagrams illustrating uses of multiple pairs of vanes. For illustrative purposes, FIGS. 6C and 6D depict two pairs of vanes 230, one pair mounted above the horizontal centerplane of the nozzle (top pair) and the other pair mounted below the horizontal centerplane of the nozzle (bottom pair). The mounting and actuation of each pair of vanes is symmetric around the vertical centerplane. Either or both pairs of vanes may be activated. In the illustration of FIG. 6C, the top pair is activated and the bottom pair is deactivated. The resulting vectoring of the outgoing flow direction 620 and velocity isocontours 670 are thus similar to those of FIG. 6B. In the illustration of FIG. 6D, the bottom pair is activated and the top pair is inactive. The vectoring of the outgoing flow direction 620 is primarily in the downward direction, resulting in velocity isocontours 670 that are non-concentric (e.g., non-coaxial, or eccentric) and elongated primarily in the downward direction. The reduced velocity gradient in the downward direction is expected to cause a noise reduction in the downward direction. The particular deformation of the velocity isocontours of FIG. 6D may be suitable for reduction of noise monitored by the takeoff/cutback and/or the approach monitors.

FIGS. 6C and 6D discussed above illustrate one type of control logic for the actuation of the vanes wherein the vanes are activated selectively depending on the direction in which noise reduction is desired. Alternatively, the arrangements of FIGS. 6C and 6D may be used in combination (e.g., both pairs of vanes may be activated) with equal or unequal vectoring of the outgoing flow direction 620.

The above concept of selective/variable activation of the vanes may be extended to more than two pairs of vanes. It is contemplated that the aforementioned noise suppression scheme may be used in combination with thrust vectoring of the fan flow in situations where the fan nozzle 210 is to provide control (fully or partially) for the motion of an aircraft. Longitudinal control may be achieved by the vanes vectoring fan stream in the downward or upward directions along the vertical axis 640. Yaw control may be achieved by the vanes 230 vectoring the fan stream 215 in the positive or negative direction along the horizontal axis 650. Roll control may be achieved by the vanes 230 imparting a swirling motion to the fan stream 215.

Figure 7A:
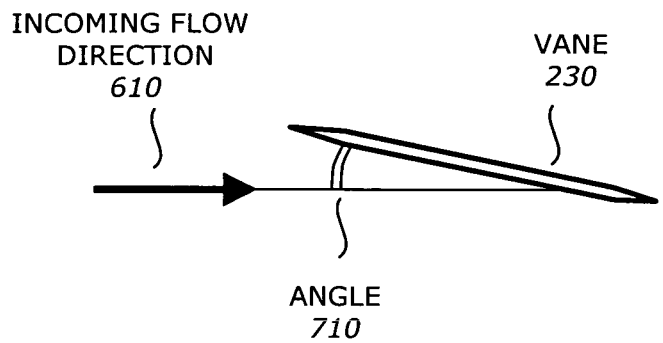
FIG. 7A is a diagram illustrating a vane including a thin flat plate angled to the incoming flow direction according to one embodiment of the invention.

FIG. 7A is a diagram illustrating a vane including a thin flat plate angled to the incoming flow direction according to one embodiment of the invention. The vane 230 includes a thin flat plate angled to direction of the incoming flow 610. The angle 710 may be fixed or variable. The angle 710 may range from 0 to 30 degrees, although a range of 0 to 10 degrees may be preferred to avoid flow separation and possible shock losses. In deactivation mode, the vane 230 may be at zero angle 710 with respect to the incoming flow direction 610. In activation mode, the vane 230 may be rotated to a positive angle 710 with respect to the incoming flow direction 610.

Figure 7B:
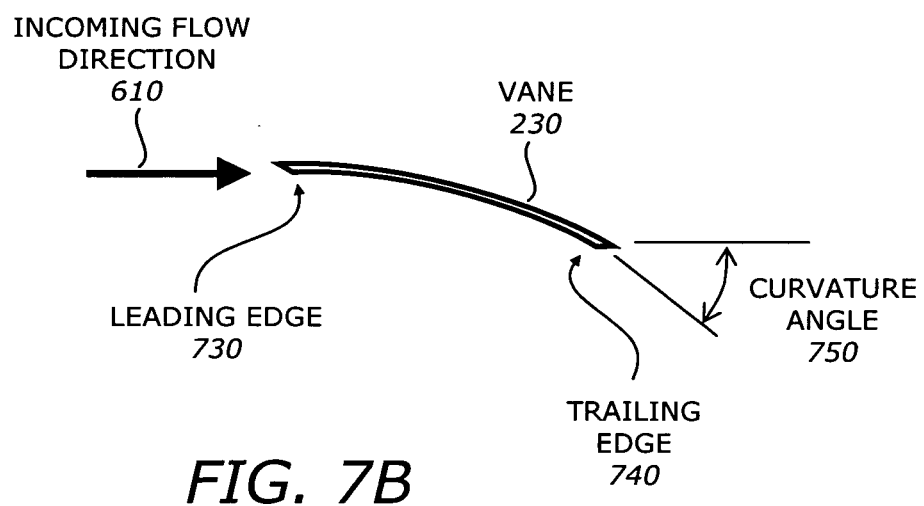
FIG. 7B is a diagram illustrating a vane including a thin plate with curvature according to one embodiment of the invention.

FIG. 7B is a diagram illustrating a vane including a thin plate with curvature according to one embodiment of the invention. The vane 230 includes a thin curved plate having a leading edge 730 and a trailing edge 740, connected by a curved surface. The curvature of the vane 230 may be fixed or variable. An angle of curvature 750 is defined as the angle of the trailing edge 740 of the plate relative to the angle of the leading edge 730 of the plate which is substantially aligned with the incoming flow direction 610. The angle of curvature 750 may range from 0 to 30 degrees, although a range of 0 to 10 degrees may be preferred to avoid flow separation and possible shock losses. In deactivation mode, the angle of curvature 750 of the vane 230 may be zero, meaning that the vane 230 is a thin flat plate aligned with the incoming flow direction 610. In activation mode, the vane 230 may be curved with a positive angle of curvature where the trailing edge 740 is moved pointing downward. Such variable-curvature vane may be achieved by mechanical means or by use of shape-memory alloys.

Figure 7C:
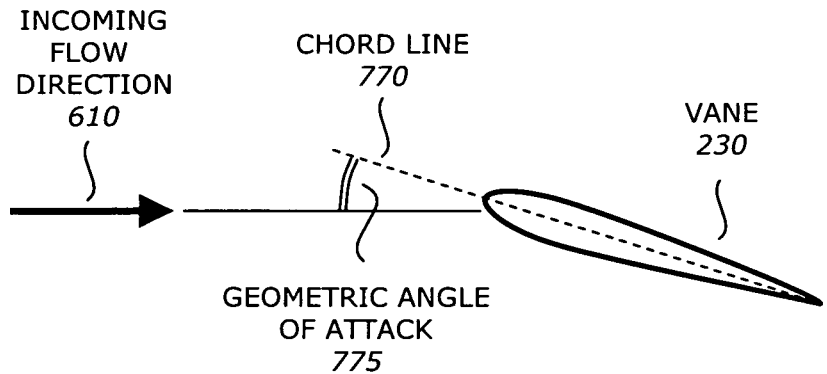
FIG. 7C is a diagram illustrating a vane including a symmetric airfoil at a geometric angle of attack according to one embodiment of the invention.

FIG. 7C is a diagram illustrating a vane including a symmetric airfoil at a geometric angle of attack according to one embodiment of the invention. The vane 230 has a cross section of a symmetric airfoil. A chord line 770 of an airfoil is defined as the straight line through the leading edge and trailing edge of the airfoil. The chord line 770 is at a geometric angle of attack 775 relative to the incoming flow direction 610. The geometric angle of attack 775 may be fixed or variable. The geometric angle of attack 775 may range from 0 to 30 degrees, although a range of 0 to 10 degrees may be preferred to avoid flow separation and possible shock losses. In deactivation mode, the geometric angle of attack 775 may be zero. In activation mode, the vane 230 may be rotated to a positive geometric angle of attack 775.

Figure 7D:
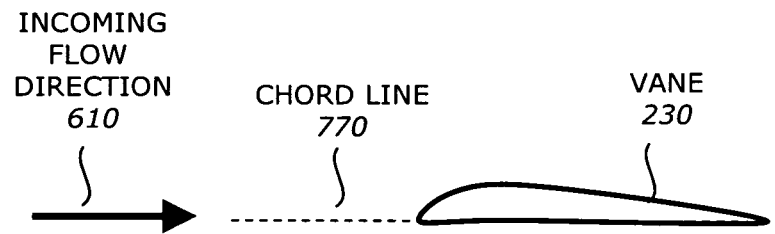
FIG. 7D is a diagram illustrating a vane including an asymmetric airfoil at zero geometric angle of attack according to one embodiment of the invention.

FIG. 7D is a diagram illustrating a vane including an asymmetric airfoil at zero geometric angle of attack according to one embodiment of the invention. The vane 230 has a cross section of an asymmetric airfoil placed at a zero geometric angle of attack relative to the incoming flow direction 610. Because the airfoil is asymmetric, or cambered, it produces a positive lift at the zero geometric angle of attack. Operation of the vane 230 may be fixed or variable. In fixed operation, the vane 230 has the cross section of an asymmetric airfoil and is placed at zero geometric angle of attack, as shown in FIG. 7D. In variable operation, the vane 230 has a variable cross section: in deactivation mode, the cross section is a symmetric airfoil, such as the airfoil shown in FIG. 7C with zero geometric angle of attack 775 in activation mode, the cross section assumes the shape of an asymmetric (e.g., cambered) airfoil as depicted in FIG. 7D. Such variable-camber airfoil may be achieved by mechanical means or by use of shape-memory alloys. The variable-camber airfoil may obviate the need for a rotation mechanism for the vane 230.

Figure 7E:
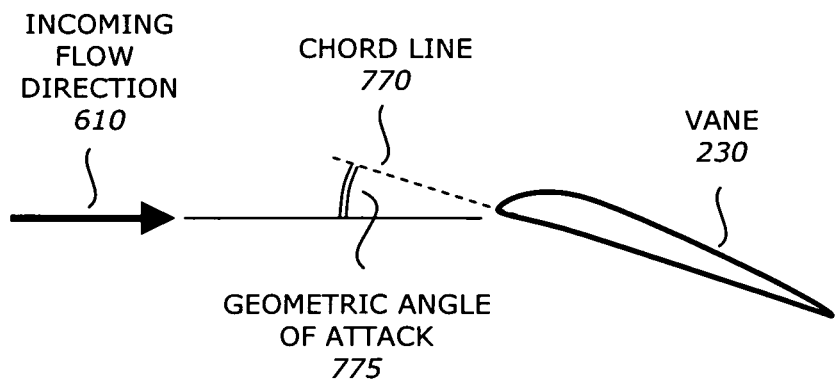
FIG. 7E is a diagram illustrating a vane including an asymmetric airfoil at a geometric angle of attack according to one embodiment of the invention.

FIG. 7E is a diagram illustrating a vane including an asymmetric airfoil at a geometric angle of attack according to one embodiment of the invention. The chord line 770 makes a geometric angle of attack 775 relative to the incoming flow direction 610. The geometric angle of attack 775 may be fixed or variable. The maximum geometric angle of attack 775 may range up to 30 degrees, although a maximum value of 10 degrees may be preferred to avoid flow separation and possible shock losses. In deactivation mode, the vane 230 may be placed at a negative geometric angle of attack 775 so that it produces a zero lift. In activation mode, the vane 230 may be rotated to a zero or positive geometric angle of attack 775. The asymmetric airfoils exemplified in FIGS. 7D and 7E may be of the supercritical type to delay onset of supersonic flow over the airfoil thus mitigating excessive drag of the vane that may result in significant thrust loss.

As is known by one skilled in the art, various combinations of the embodiments depicted in FIGS. 7A through 7E may be possible for the design and activation or the vanes. Further, each vane, or pair of vanes, may be activated at different angles of attack, cambers, or curvatures, to satisfy particular requirements of the mission of the aircraft.

Figure 8A:
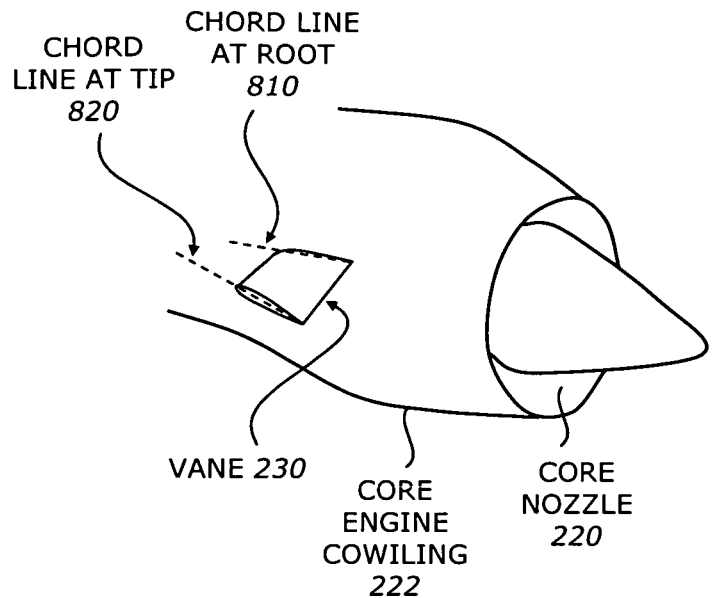
FIG. 8A is a diagram illustrating a vane having a twisted cross section along its span according to one embodiment of the invention.

FIG. 8A is a diagram illustrating a vane having a twisted cross section along its span according to one embodiment of the invention. For clarity, the fan nacelle 214 is omitted in this figure as well as in subsequent FIGS. 8A-8D. In the illustration of FIG. 8A, the root of the vane 230 is the side of the vane 230 proximal to the cowling 222 and the tip of the vane 230 is the side of the vane 230 distal to the cowling 222. The chord line at the root 810 and the chord line at the top 820 are at different geometric angles of attack. In other words, the vane 230 has a twist along its span. The twist may be desirable to impart a radial variation in the vectoring of the fan flow. For example, the root chord line 810 may be at a small or zero angle of attack and the tip chord line 820 may be at a larger angle of attack. At this configuration, the fan air proximal to the cowling 222 may not be vectored significantly but the fan air distal to the cowling 222 (i.e., proximal to the fan nacelle 214) may be vectored significantly. This arrangement may help prevent a substantial increase in the velocity gradients at the top of the nozzle thus avoiding significant increase in upward-directed noise that may reflect downward from aircraft surfaces.

Figure 8B:
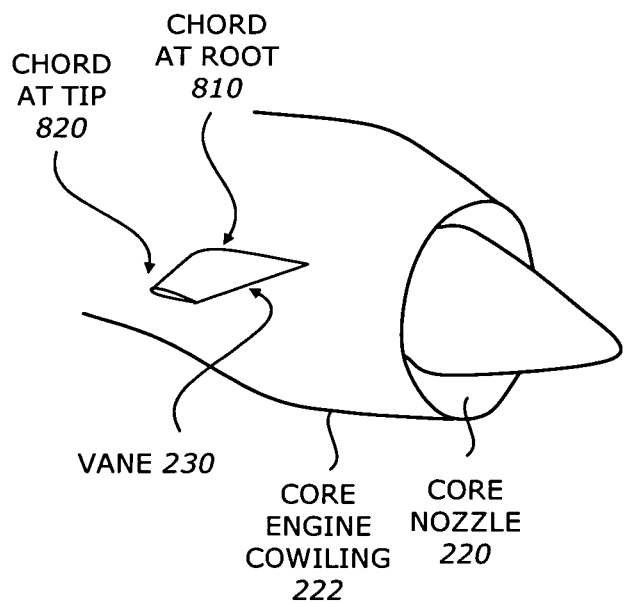
FIG. 8B is a diagram illustrating a vane having a tapered cross section along its span according to one embodiment of the invention.

FIG. 8B is a diagram illustrating a vane having a tapered cross section according to one embodiment of the invention. The vane 230 has the root chord 810 and the tip chord 820 having different lengths. This type of vane has a taper along its span. The taper may be desirable for structural reasons or for imparting a radial variation of vectoring as discussed above.

Figure 8C:
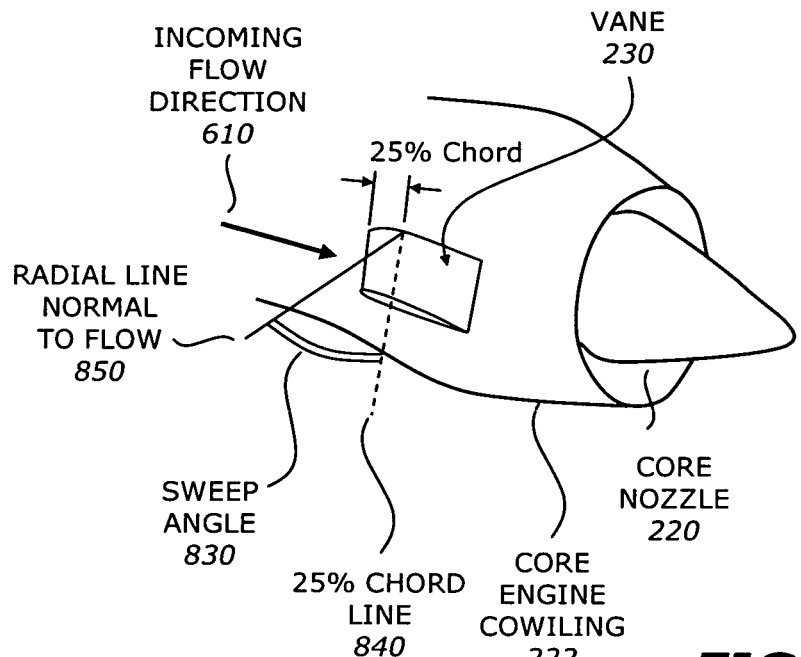
FIG. 8C is a diagram illustrating a vane having a sweep angle according to one embodiment of the invention.

FIG. 8C is a diagram illustrating a vane having a sweep angle according to one embodiment of the invention. The vane 230 has a sweep angle 830, defined as the angle between the 25% chord line 840 and a radial line 850 normal to the flow direction 610. The 25% chord line is the line on the longitudinal plane of the vane at a distance of 25% chord length from the leading edge of the vane. Sweeping the vane 230 may prevent or delay formation of shock waves over the vane 230 when the vane 230 operates in a high-subsonic environment.

Figure 8D:
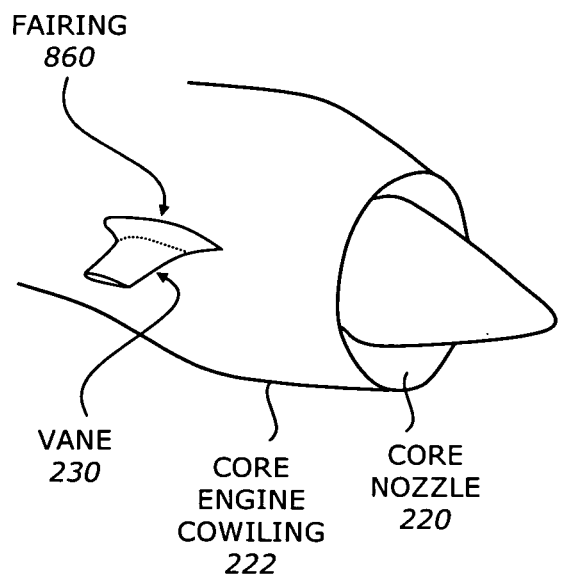
FIG. 8D is a diagram illustrating a vane having a fairing according to one embodiment of the invention.

FIG. 8D is a diagram illustrating a vane having a fairing according to one embodiment of the invention. The vane 230 has a fairing 860 at its root. The fairing 860 may mitigate secondary-flow losses that arise from the junction of the vane 230 with its mounting surface. Although the fairing 860 is shown at a root, it may also be installed at the tip of the vane 230.

Figure 9:
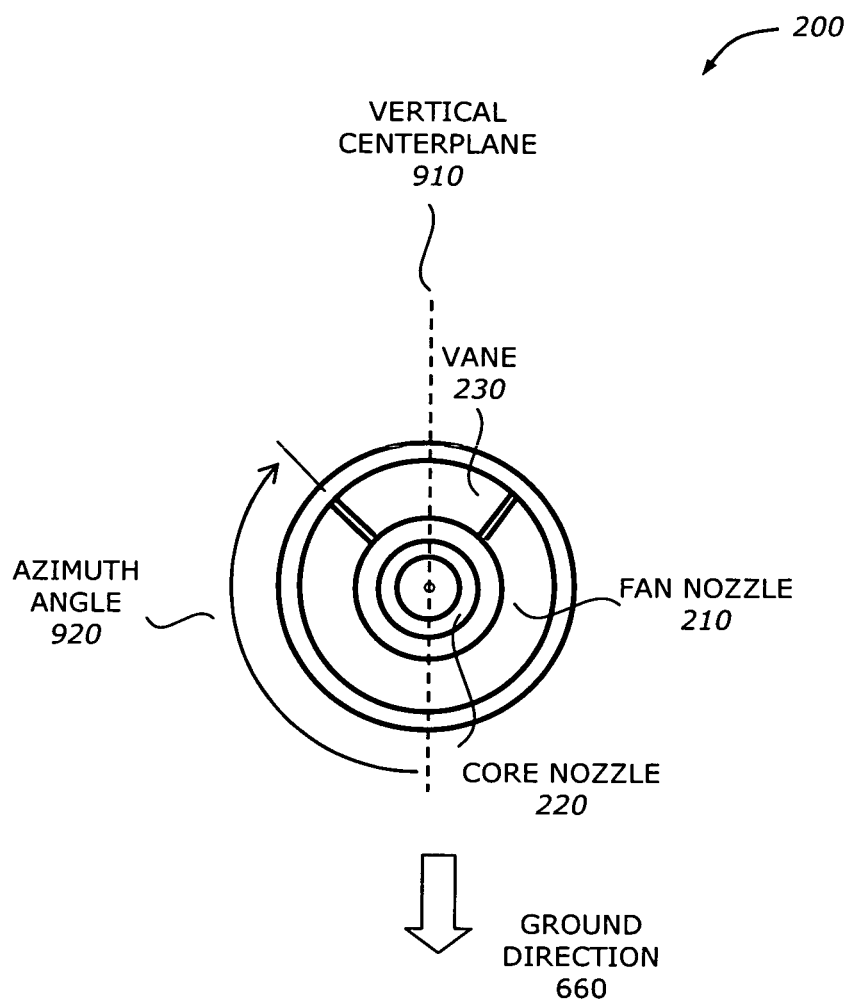
FIG. 9 is a diagram illustrating a rear view of the fan flow deflection system with a vane azimuth angle according to one embodiment of the invention.

FIG. 9 is a diagram illustrating a rear view of the fan flow deflection system with a vane azimuth angle according to one embodiment of the invention. The figure considers one pair of vanes arranged symmetrically around the vertical centerplane 910. The azimuth angle 920 of the vane 230 is measured from the downward vertical. The azimuth angle 920 may range from 20 degrees to 180 degrees. This is applicable to a single pair of vanes, as shown in FIG. 9, or multiple pairs of vanes, as illustrated in FIG. 10C. In using multiple pairs of vanes, the azimuthal spacing between pairs may be as small as approximately 5 degrees. For small azimuthal spacings between vanes or vane pairs, a cascade of vanes may be obtained. A cascade of vanes may offer improved aerodynamic efficiency in vectoring the fan flow compared to a single pair of vanes, particularly in cases where strong vectoring is desired.

Figure 10A:
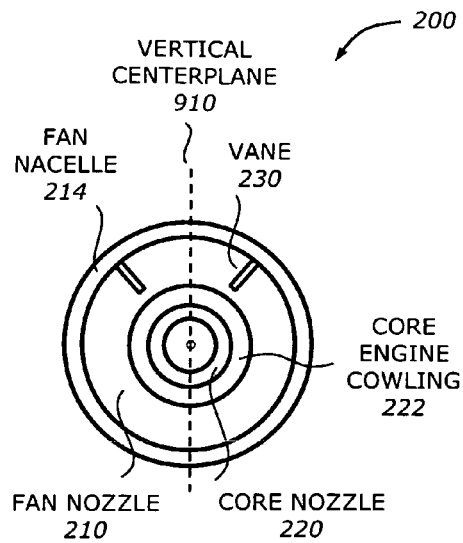
FIG. 10A is a diagram illustrating a rear view of the fan flow deflection system having vanes extending inwardly from outer surface of annular passage of fan nozzle according to one embodiment of the invention.

FIG. 10A is a diagram illustrating a rear view of the fan flow deflection system having vanes extending inwardly from outer surface of annular passage of fan nozzle according to one embodiment of the invention. The vanes 230 are attached to the inner surface of the fan nacelle 214 and extend inwardly and substantially radially toward the core engine cowling 222. The vanes may span partially or fully the local width of the annular passage of the fan nozzle 210.

Figure 10B:
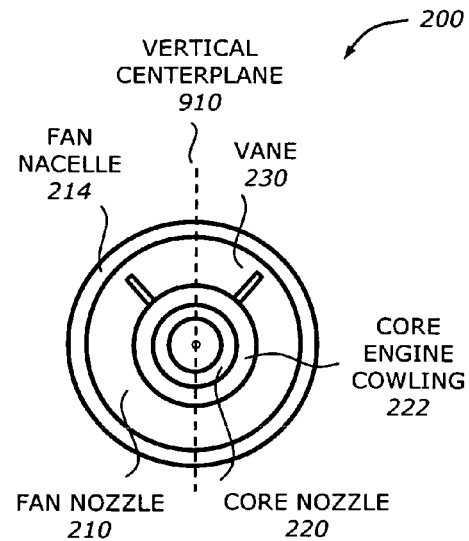
FIG. 10B is a diagram illustrating a rear view of the fan flow deflection system having vanes extending outwardly from inner surface of annular passage of fan nozzle according to one embodiment of the invention.
Figure 10C:
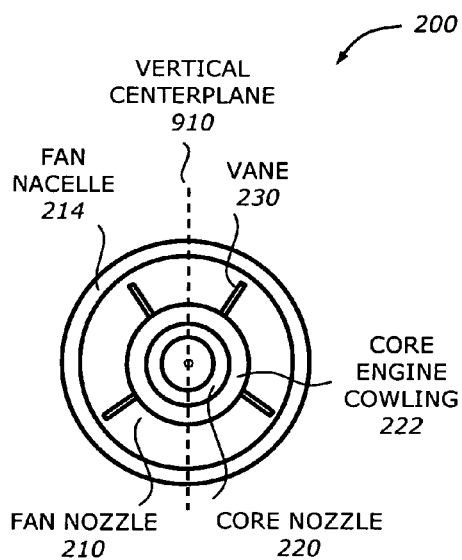
FIG. 10C is a diagram illustrating a rear view of the fan flow deflection system having vanes arranged in pairs symmetrically around a vertical plane through axis of fan nozzle according to one embodiment of the invention.

FIG. 10B is s a diagram illustrating a rear view of the fan flow deflection system having vanes extending outwardly from inner surface of annular passage of fan nozzle according to one embodiment of the invention. The vanes 230 are attached to the core engine cowling 222 and extend outwardly and substantially radially toward the inner surface of the fan nacelle 214. The vanes 230 may span partially or fully the local width of the annular passage of the fan nozzle 210.

FIG. 10C is a diagram illustrating a rear view of the fan flow deflection system having vanes arranged in pairs symmetrically around a vertical plane through axis of fan nozzle according to one embodiment of the invention. Two pairs of vanes 230 are arranged symmetrically around the vertical centerplane 910 of the nozzle. The vanes 230 may be attached to the core engine cowl 222, the inner surface of the fan nacelle 214, or both.

Figure 10D:
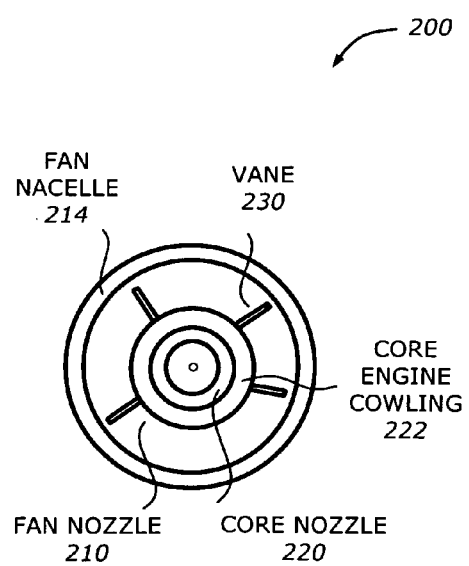
FIG. 10D is a diagram illustrating a rear view of the fan flow deflection system having vanes arranged asymmetrically around a circumference of the fan nozzle according to one embodiment of the invention.

FIG. 10D is a diagram illustrating a rear view of the fan flow deflection system having vanes arranged asymmetrically around a circumference of the fan nozzle according to one embodiment of the invention. The vanes 230 are arranged asymmetrically, or unevenly around the circumference of the fan nozzle 210. Uneven spacing of the vanes 230 may be used to break up the coherence of possible fan tones produced by the fan rotor of the engine. The number of the vanes 230 may be even or odd.

Figure 11A:
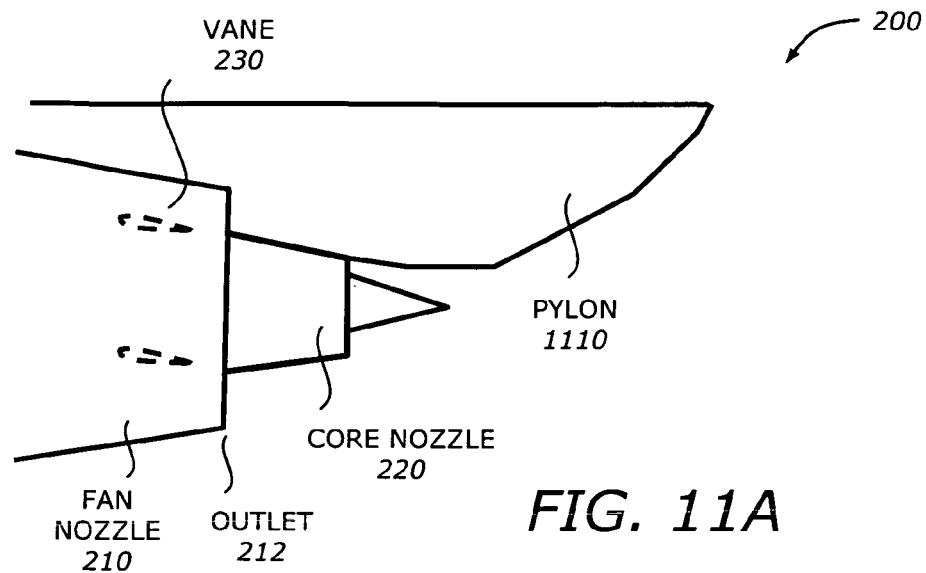
FIG. 11A is a diagram illustrating a side view of a fan flow deflection system with a mounting pylon according to one embodiment of the invention.

FIG. 11A is a diagram illustrating a side view of a fan flow deflection system 200 with a mounting pylon according to one embodiment of the invention. The fan flow deflection system 200 includes a substantially annular fan nozzle 210, a core nozzle 220, a mounting pylon 1110, and at least one vane 230. The fan nozzle 210, the core nozzle 220, and the pylon 1110 represent the well-known art of the exhaust of a separate-flow turbofan engine. The fan nozzle 210 and the core nozzle 220 are parts of a jet engine of an aircraft. The pylon 1110 is a structural member that supports the engine on the wing or on the fuselage. For a wing-mounted engine, the pylon is substantially vertical. For a typical fuselage-mounted engine, the pylon is substantially horizontal. The pylon structure extends longitudinally from near the front of the engine to downstream of the core exhaust. The structure cuts through the fan nozzle 210 on the attachment side. Inside the fan nozzle 210, the pylon leading edge is located substantially upstream of the outlet 212.

At least one vane 230 extends from the boundary flow surface as defined in FIG. 3. The operation of the vanes 230 in the presence of the pylon 1110 is substantially the same as without the pylon 1110.

Figure 11B:
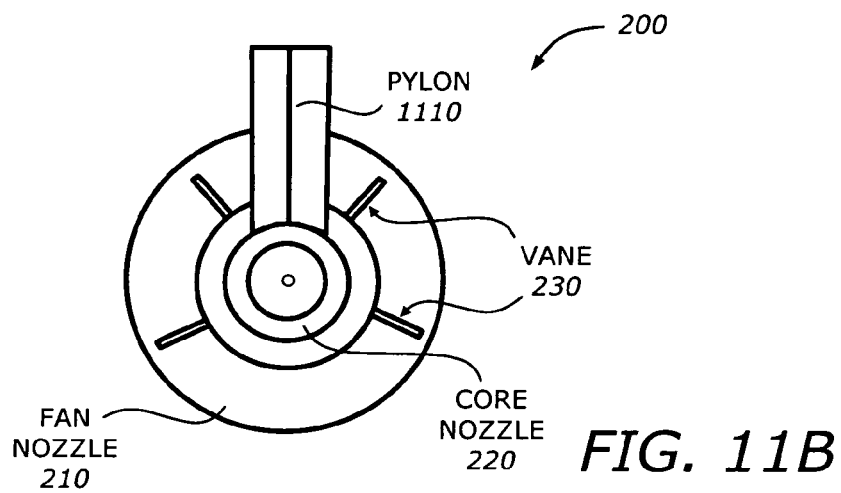
FIG. 11B is a diagram illustrating a rear view of a fan flow deflection system with a vertical mounting pylon according to one embodiment of the invention.

FIG. 11B is a diagram illustrating a rear view of a fan flow deflection system with a vertical mounting pylon according to one embodiment of the invention. The vanes 230 are arranged symmetrically around a vertical pylon 1110. This type of arrangement would be applicable to aircraft with wing-mounted engines.

Figure 11C:
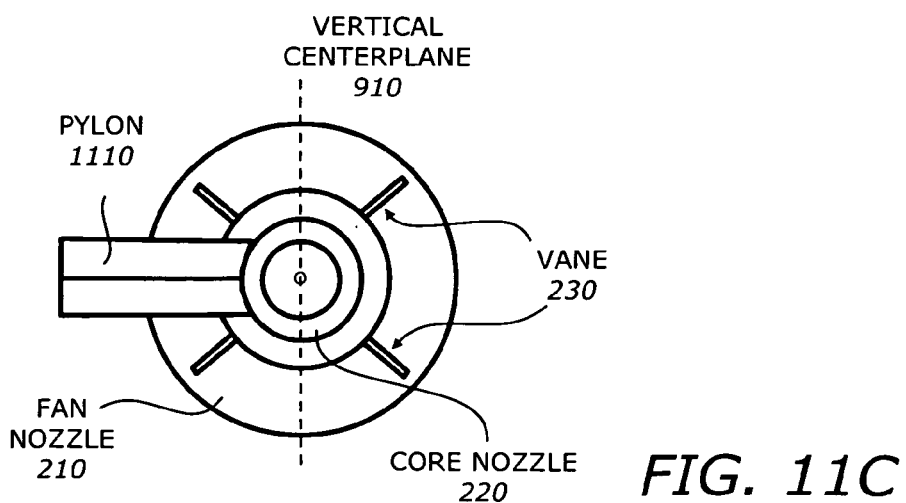
FIG. 11C is a diagram illustrating a rear view of a fan flow deflection system with a horizontal mounting pylon according to one embodiment of the invention.

FIG. 11C is a diagram illustrating a rear view of a fan flow deflection system with a horizontal mounting pylon according to one embodiment of the invention. The vanes 230 are in a nozzle with horizontal pylon 1110. In this case the vanes 230 are typically arranged symmetrically around the vertical centerplane 910 of the engine. This type of arrangement would be applicable to aircraft with fuselage-mounted engines.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A turbofan noise suppression system comprising:
a substantially annular fan nozzle and a core nozzle of a separate-flow turbofan engine, the fan nozzle having a flow boundary surface and an outlet to discharge a fan stream into atmosphere, the core nozzle discharging a primary stream into the atmosphere, the fan stream and the primary stream being substantially coaxial; and
a plurality of vanes attached to the fan nozzle and extending substantially radially from the flow boundary surface, the vanes include a leading edge, an upper surface and a lower surface that are in contact with the fan stream, the upper surface being opposite to the lower surface, the vanes having a first position (i) where at least one of the upper surface and the lower surface is substantially aligned with the fan stream and (ii) where the trailing edge is at a first location, and a second position where (i) the at least one of the upper surface and the lower surface is angled with respect to the fan stream and (ii) where the trailing edge is at a second location, and (iii) vectoring at least a portion of the fan stream toward a direction where noise suppression is desired such that an overall direction of the fan stream is not aligned with the primary stream, wherein the vanes are immersed into the fan stream in the first position and in the second position such that the upper and the lower surfaces are in contact with the fan stream in the first position and in the second position, the vanes being situated in proximity of the outlet of the fan nozzle and having a span substantially greater than a thickness of a local boundary layer of the fan air.

2. The system of claim 1 wherein at least one vane comprises a thin flat plate angled relative to direction of an incoming flow of the fan air.

3. The system of claim 1 wherein at least one vane comprises a curved thin plate.

4. The system of claim 1 wherein a cross section of at least one vane is an airfoil.

5. The system of claim 4 wherein the airfoil is symmetric and inclined at a geometric angle of attack relative to the direction of the incoming flow of the fan air.

6. The system of claim 4 wherein the airfoil is asymmetric and at zero or non-zero geometric angle of attack relative to the direction of the incoming flow of the fan air.

7. The system of claim 4 wherein the airfoil is supercritical to avoid shock losses.

8. The system of claim 4 further comprising an actuator to actuate the vanes to vector the fan air.

9. The system of claim 8 wherein the actuator rotates the vanes to an angle of attack.

10. The system of claim 9 wherein the actuator changes camber of the airfoil.

11. The system of claim 1 further comprising an actuator to actuate the vanes to vector the fan air.

12. The system of claim 11 wherein the actuator rotates the vanes to an angle of attack.

13. The system of claim 11 wherein the actuator changes the curvature of the vanes.

14. The system of claim 11 wherein the actuator includes activation of a shape-memory alloy to rotate the vanes and/or change the curvature.

15. The system of claim 11 wherein the actuator includes activation of a shape-memory alloy to rotate and/or change camber of the vanes.

16. The system of claim 1 wherein the flow boundary surface includes an inner surface and an outer surface of inside of an annulus.

17. The system of claim 16 wherein at least one vane extends inwardly from the outer surface.

18. The system of claim 16 wherein at least one vane extends outwardly from the inner surface.

19. The system of claim 16 wherein at least one vane spans gap between the inner surface and outer surface.

20. The system of claim 1 wherein the vanes are arranged in pairs symmetrically around a vertical plane through axis of the fan nozzle.

21. The system of claim 20 wherein the vanes have unequal angles of attack.

22. The system of claim 1 wherein the vanes are arranged asymmetrically around a circumference of the fan nozzle.

23. The system of claim 1 wherein the vanes have equal angles of attack relative to an incoming flow direction.

24. The system of claim 1 wherein the vanes have unequal curvatures.

25. The system of claim 1 further comprising a mounting pylon attached to the fan nozzle.

26. The system of claim 25 wherein the vanes are arranged in pairs symmetrically about the pylon.

27. The system of claim 25 wherein the vanes are arranged asymmetrically about the pylon.

28. The system of claim 1 wherein at least one vane is tapered.

29. The system of claim 1 wherein at least one vane is twisted.

30. The system of claim 1 wherein at least one vane is swept relative to an incoming flow direction.

31. The system of claim 1 wherein at least one vane has an azimuthal angle relative to a downward vertical direction, ranging from 20 degrees to 180 degrees.

32. The system of claim 1 wherein the vanes are closely spaced to form a cascade.

* * * * *